United States Patent
Codron et al.

(10) Patent No.: US 9,303,562 B2
(45) Date of Patent: Apr. 5, 2016

(54) METHODS AND SYSTEMS FOR OPERATING GAS TURBINE ENGINES

(71) Applicant: General Electric Company, Schenectady, NY (US)

(72) Inventors: Fabien Thibault Codron, Simpsonville, SC (US); John Edward Pritchard, Simpsonville, SC (US); Stanley Kevin Widener, Greenville, SC (US)

(73) Assignee: General Electric Company, Schenectady, NY (US)

( * ) Notice: Subject to any disclaimer, the term of this patent is extended or adjusted under 35 U.S.C. 154(b) by 686 days.

(21) Appl. No.: 13/741,797

(22) Filed: Jan. 15, 2013

(65) Prior Publication Data

US 2014/0196466 A1 Jul. 17, 2014

(51) Int. Cl.
*F02C 7/22* (2006.01)
*F02C 7/228* (2006.01)

(52) U.S. Cl.
CPC .. *F02C 7/22* (2013.01); *F02C 7/228* (2013.01)

(58) Field of Classification Search
CPC ............... F02C 7/22; F02C 7/28; F23R 3/34; F23R 3/28
USPC ..................................................... 60/739, 74
See application file for complete search history.

(56) References Cited

U.S. PATENT DOCUMENTS

| | | | | |
|---|---|---|---|---|
| 4,716,719 A | * | 1/1988 | Takahashi | F02C 9/26 60/247 |
| 7,197,879 B2 | | 4/2007 | Beuhman et al. | |
| 7,726,112 B2 | | 6/2010 | Dooley | |
| 8,122,725 B2 | * | 2/2012 | Myers | F02C 7/228 60/39.281 |
| 8,484,979 B2 | * | 7/2013 | Lam | F23R 3/346 60/737 |
| 2005/0217269 A1 | * | 10/2005 | Myers, Jr. | F02C 7/236 60/739 |
| 2008/0016875 A1 | * | 1/2008 | Ryan | F02C 7/26 60/776 |
| 2010/0192537 A1 | | 8/2010 | Kunkle et al. | |
| 2011/0107765 A1 | * | 5/2011 | Valeev | F02C 7/228 60/746 |
| 2011/0185743 A1 | | 8/2011 | Snider et al. | |

* cited by examiner

*Primary Examiner* — Charles Freay
(74) *Attorney, Agent, or Firm* — Armstrong Teasdale LLP

(57) ABSTRACT

Methods and systems for operating a gas turbine engine including a fuel delivery system and a plurality of combustor assemblies are provided. The fuel delivery system comprises a primary fuel circuit configured to continuously supply fuel to each of the plurality of combustor assemblies during a first mode of operation and a second mode of operation. At least one secondary fuel circuit of the fuel delivery system is configured to supply fuel to each of the plurality of combustor assemblies during the second mode of operation. The secondary fuel circuit includes at least one isolation valve coupled in flow communication with each of the plurality of combustor assemblies. The at least one isolation valve facilitates preventing fluid flow upstream into the secondary fuel circuit during the first mode of operation. The fuel delivery system, using the isolation valve, replaces a purging system in the gas turbine engine.

20 Claims, 3 Drawing Sheets

METHODS AND SYSTEMS FOR OPERATING GAS TURBINE ENGINES

BACKGROUND OF THE DISCLOSURE

The embodiments described herein relate generally to gas turbine engines, and more specifically to methods and systems for operating gas turbine engines.

Known gas turbine engines generally include a compressor, one or more combustors that each include a fuel injection system, and a turbine section. In at least some known engines, the combustors are typically arranged in an annular array about the engine and are interconnected for the purposes of ignition. The compressor raises the pressure of inlet air, and then channels the pressurized air towards the combustors, where it cools the combustion chamber walls and is used in the combustion process. More specifically, in the combustion chamber, compressed air is mixed with a fuel and the mixture is ignited to produce hot combustion gases.

In some known combustion turbines, the turbine may be powered using either a fuel gas or a liquid fuel. Such turbines may have fuel supply systems for both liquid and gas fuels, but generally do not burn both gas and liquid fuels simultaneously. Rather, when the combustion turbine burns liquid fuel, the gas fuel supply may be removed from service. Alternatively, when the combustion turbine burns fuel gas, the liquid fuel supply may be removed from service.

In some known industrial combustion turbines, the combustion system may include an array of combustors that each includes at least one liquid fuel nozzle and at least one gas fuel nozzle. In such an arrangement, combustion may be initiated within the combustion chamber slightly downstream from the fuel nozzles. Air from the compressor may flow around and through the combustors to provide oxygen for combustion.

Some known gas turbine engines include multiple fuel circuits for each fuel type that may operate during predetermined modes of operation. When one circuit is removed from service, fuel in the idle circuit may remain in the idle fuel manifold. However, hot combustion gases or hot air may flow back from the combustors into the idle fuel circuit and ignite the residual fuel. To prevent this occurrence, known gas turbine engines may purge the idle manifold with either compressor discharge air or inert gas such as nitrogen to remove the residual fuel from the manifold. However, known purge systems are expensive and complicated to operate.

Accordingly, there exists a need for a simplified and cost effective fuel system that prevents the flow of hot combustion gases between the combustors and the idle fuel circuit.

BRIEF DESCRIPTION OF THE DISCLOSURE

In one aspect, a fuel delivery system for a gas turbine engine including a plurality of combustor assemblies is provided. The fuel delivery system comprises a primary fuel circuit configured to continuously supply fuel to each of the plurality of combustor assemblies during a first mode of operation and a second mode of operation. At least one secondary fuel circuit of the fuel delivery system is configured to supply fuel to each of the plurality of combustor assemblies during the second mode of operation. The secondary fuel circuit comprises at least one isolation valve coupled in flow communication with each of the plurality of combustor assemblies. The at least one isolation valve facilitates preventing fluid flow upstream into said secondary fuel circuit during said first mode of operation, wherein the gas turbine engine does not include a purging system.

In another aspect, a method for controlling fuel flow in a gas turbine engine including a plurality of combustor assemblies is provided. Each of the combustor assemblies includes at least one fuel circuit, and a fuel delivery system supplies each fuel circuit with fuel. The method comprises supplying fuel to each of the plurality of combustor assemblies via a primary fuel circuit during a first mode of operation. During a second mode of operation, the method comprises supplying fuel to each of the plurality of combustor assemblies via the primary fuel circuit and at least one secondary fuel circuit. Each of the at least one secondary fuel circuits comprises at least one isolation valve coupled in flow communication with each of the plurality of combustor assemblies. Each isolation valve facilitates preventing fluid flow upstream into said secondary fuel circuit during said first mode of operation, wherein the gas turbine engine does not include a purging system.

In yet another aspect, a gas turbine engine assembly comprising a plurality of combustor assemblies is provided. The gas turbine engine assembly further comprises a primary fuel circuit configured to continuously supply fuel to each of the plurality of combustor assemblies during a first mode of operation and a second mode of operation. At least one secondary fuel circuit of the gas turbine engine assembly is configured to supply fuel to each of the plurality of combustor assemblies during the second mode of operation. The secondary fuel circuit comprises at least one isolation valve coupled in flow communication with each of the plurality of combustor assemblies. The at least one isolation valve facilitates preventing fluid flow upstream into said secondary fuel circuit during said first mode of operation, wherein the gas turbine engine assembly does not include a purging system.

DETAILED DESCRIPTION OF THE DISCLOSURE

Figure 1:
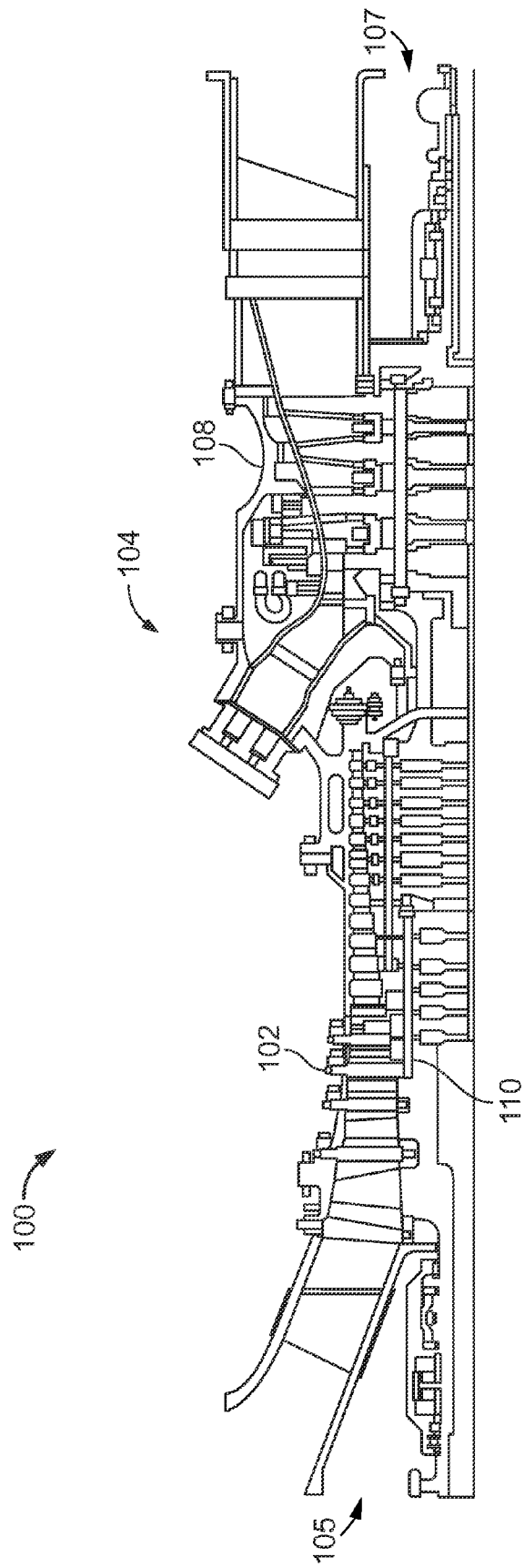
FIG. 1 is a schematic illustration of an exemplary gas turbine engine.

FIG. 1 is a schematic illustration of an exemplary gas turbine engine 100. Engine 100 includes a compressor assembly 102 and a plurality of combustor assemblies 104. Engine 100 also includes a turbine 108 and a common compressor/turbine shaft 110, sometimes referred to as rotor 110. Combustor assembly 104 is coupled in flow communication with turbine assembly 108 and with compressor assembly 102.

In operation, air enters engine 100 through an inlet 105 and flows downstream through compressor assembly 102 such that compressed air is supplied to combustor assemblies 104. Fuel is channeled to a combustion region defined (not shown in FIG. 1) within combustor assemblies 104, wherein the fuel is mixed with the air and ignited. Combustion gases are generated and channeled to turbine 108, wherein gas stream thermal energy is converted to mechanical rotational energy, and discharged from engine 100 through an outlet 107. Turbine 108 is rotatably coupled to shaft 110. As used herein, the term "upstream" refers to a location adjacent to inlet 105, and "downstream" refers to a location adjacent to outlet 107.

Figure 2:
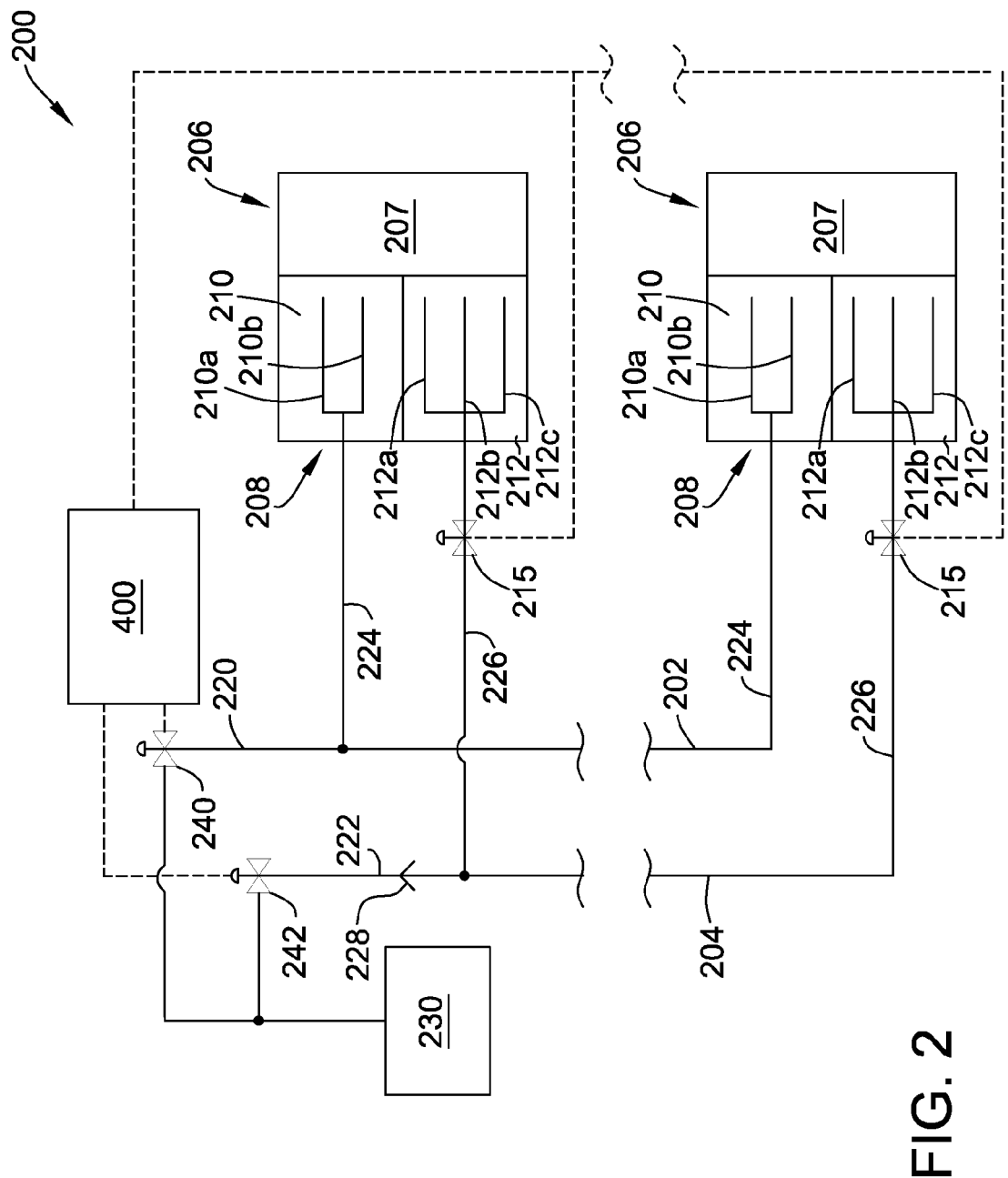
FIG. 2 is a simplified block diagram of an exemplary fuel delivery system that may be utilized with the gas turbine engine shown in FIG. 1.

FIG. 2 is a simplified block diagram of an exemplary fuel delivery system 200 that may be utilized with gas turbine engine 100 shown in FIG. 1. In the exemplary embodiment, gas turbine engine 100 includes eighteen combustor assemblies 206 that, in the embodiment, form an annular ring (not shown). In other embodiments, any other number of combustor assemblies 206 may be used. In the exemplary embodiment, each combustor assembly 206 includes a combustor nozzle assembly 208 integral to combustor assembly 206. Combustor nozzle assembly 208 includes at least a primary fuel nozzle assembly 210 coupled to a primary fuel circuit 202 and a secondary fuel nozzle assembly 212 coupled to a secondary fuel circuit 204. In the exemplary embodiment, primary nozzle assembly 210 and secondary nozzle assembly 212 are sub-groups of nozzles and together make up combustor nozzle assembly 208, wherein combustor nozzle assembly 208 is an integral component of combustor assembly 206.

Although FIG. 2 illustrates gas turbine engine 100 as including two combustor assemblies 206 and two fuel nozzle assemblies 208, it should be realized that fuel system 200 may be used with a gas turbine engine including n combustor assemblies and n*x fuel nozzle assemblies, wherein n≥2 and x≥2. For example, gas turbine engine 100 may include 18 (n=18) combustors and if x=2, engine 100 will include 36 fuel nozzle assemblies. In such an embodiment, engine 100 includes two fuel nozzle assemblies per combustor. In the exemplary embodiment, each combustor assembly 206 contains as many fuel nozzle assemblies as fuel system 200 contains fuel circuits, such as primary fuel circuit 202 and secondary fuel circuit 204.

Each nozzle assembly 210 and 212 may include a plurality of individual nozzles. Specifically, primary fuel nozzle assembly 210 includes nozzles 210a and 210b, and secondary nozzle assembly 212 includes nozzles 212a, 212b, and 212c. In the exemplary embodiment, combustor assemblies 206 form an annular ring around an inner periphery of gas turbine engine 100, and as part of each combustor assembly 206, fuel nozzle assemblies 210 and 212 are similarly spaced circumferentially about gas turbine engine 100.

In the exemplary embodiment of fuel delivery system 200, primary fuel circuit 202 includes a primary fuel manifold 220, including primary fuel lines 224, and a primary staging valve 240. Secondary fuel circuit 204 includes a secondary fuel manifold 222, including secondary fuel lines 226, a secondary staging valve 242, and, for each combustor, an isolation valve 215. Fuel system 200 also includes a fuel source 230 configured to supply primary manifold 220 and secondary manifold 222 engine 100 with a fuel gas. The fuel gas may be, without limitation, synthetic gas, natural gas, or a combination thereof. Alternatively, fuel source 230 may supply manifolds 220 and 222 with a liquid fuel.

Primary and secondary fuel manifolds 220 and 222 are both metered and sized to achieve a desired pressure ratio within fuel delivery system 200 that is appropriate for the quantity of fuel being delivered to gas turbine engine 100. Primary and secondary manifolds 220 and 222, respectively, can be an aggregate of multiple subset manifolds, wherein both primary and secondary manifolds 220 and 222 include sub-manifolds (not shown) that supply fuel to nozzle subgroups at the combustor chamber level. Although the exemplary embodiment illustrates fuel delivery system 200 as including two manifolds 220 and 222, it should be realized that fuel delivery system 200 may have three or more fuel manifolds.

Although the exemplary embodiment illustrates fuel delivery system 200 as including two manifolds 220 and 222, it should be realized that fuel delivery system 200 may have three or more fuel manifolds. In the exemplary embodiment, primary manifold 220 is in flow communication with each combustor nozzle assembly 208, and more specifically, with primary fuel nozzle assembly 210, via primary fuel line 224. Secondary manifold 222 is in flow communication with each combustor nozzle assembly 208, and more specifically, with secondary fuel nozzle assembly 212, via secondary fuel line 226. In embodiments where fuel system 200 includes additional fuel circuits and manifolds, each additional fuel circuit is in flow communication with each combustor nozzle assembly 208, and therefore with each combustor assembly 206.

In the exemplary embodiment of fuel system 200, isolation valves 215 are each coupled adjacent to combustor assemblies 206 within secondary fuel lines 226. In the exemplary embodiment, isolation valves 215 may be passively controlled check valves operated by a biasing mechanism (not shown) within isolation valve 215. Alternatively, isolation valves 215 may be actively controlled actuated valves controlled by a controller 400. Isolation valves 215 facilitate preventing hot air or combustion gases within combustor assemblies 206 from flowing upstream through secondary fuel lines 226 to secondary manifold 222 when secondary fuel circuit 204 is idle. In the exemplary embodiment, isolation valves 215 are positioned proximate to combustor assemblies 206 such that the likelihood of an undesired combustion event within secondary fuel lines 226 or secondary manifold 222 is reduced.

During a first mode of operation, fuel is supplied to each combustor nozzle assembly 208 through primary fuel circuit 202. Specifically, primary fuel circuit 202 supplies fuel to combustor assemblies 206 through primary fuel nozzle assembly 210. That is, during the first mode of operation, secondary fuel circuit 204 is idle such that each combustor assembly 206 receives fuel only from primary circuit 202. During a second mode of operation, primary and secondary fuel circuits 202 and 204 supply fuel to each combustor nozzle assembly 208 through primary and secondary manifolds 220 and 222, respectively, fuel lines 224 and 226, and nozzle assemblies 210 and 212. That is, during the second mode of operation, both fuels circuits 202 and 204 are active such that each combustor assembly 206 receives fuel from both circuits 202 and 204. In the exemplary embodiment, primary fuel circuit 202 supplies each combustor nozzle assembly 208 with fuel during both first and second modes of operation.

In operation, fuel delivery system 200 is capable of delivering fuel to gas turbine engine 100 during all operating conditions. In the first mode of operation, primary staging valve 240 supplies fuel through primary manifold 220 to each combustor assembly 206 from primary fuel circuit 202, and secondary staging valve 242 supplies fuel to secondary manifold 222 However, isolation valves 215 are closed in the first mode of operation to prevent hot air or combustion gases from flowing upstream from combustor assembly 206 into secondary manifold 222.

During the first mode of operation when only primary fuel circuit 202 is active and secondary fuel circuit 204 is idle, isolation valves 215 prevent the flow of hot air or combustion gases from combustion chamber 207 upstream into secondary manifold 222. Mixture of fuel within secondary manifold 222 and the hot air or combustion gases could result in a reduction of the operational lifetime of engine 100 components. In the first mode of operation, isolation valves 215 are closed, thus retaining a stagnant volume of dormant fuel in secondary manifold 222 and secondary fuel lines 226. Alternatively, secondary manifold 222 may be pressurized with fuel between secondary staging valve 242 and isolation valve 215 at a higher pressure than the operating pressure of combustor assembly 206. This pressure differential between secondary manifold 222 and combustor assembly 206 provides an additional mechanism to prevent hot air or combustion gases from flowing upstream into secondary fuel circuit 204. Furthermore, the gases, hot air or combustion gases, in secondary manifold 222 between isolation valve 215 and secondary staging valve 242 may be vented to the atmosphere through a vent 228 such that positive isolation of pressurized fuel upstream of secondary staging valve and combustion gases downstream of isolation valves 215 is achieved.

In the exemplary embodiment of the second mode of operation, primary staging valve 240 remains open and staging valve 242 and each isolation valve 215 is opened such that each combustor assembly 206 is supplied with fuel through both primary nozzle assembly 210 and secondary nozzle assembly 212. Accordingly, in the second mode of operation, both primary fuel circuit 202 and secondary fuel circuit 204 are supplying fuel to each combustor assembly 206.

In the exemplary embodiment, when a return the first mode of operation is desired, secondary staging valve 242 and isolation valves 215 are closed to deactivate secondary fuel circuit 204. Primary fuel circuit 202 continues to provide fuel to each combustor assembly 206 through primary fuel nozzle assemblies 210. Closing secondary staging valve 242 and isolation valves 215 terminates fuel supply to combustor assemblies 206 via secondary fuel circuit 204 through secondary fuel nozzle assemblies 212. In the exemplary embodiment, residual fuel remains in secondary manifold 222 between secondary staging valve 242 and isolation valves 215. Isolation valves 215 are configured to prevent hot air or combustion gases within combustion chambers 207 from flowing upstream through secondary fuel lines 226 to secondary manifold 222 when secondary fuel circuit 204 is idle. Mixture of the residual fuel within secondary manifold 222 and the hot air or combustion gases could result in a reduction of the operational lifetime of engine 100 components.

In the exemplary embodiment of a transition to the first operating mode from the second operating mode, secondary manifold 222, containing residual fuel upstream of isolation valves 215, is pressurized between secondary staging valve 242 and isolation valve 215 such that secondary manifold 222 is at a higher pressure than the operating pressure of combustor assemblies 206 to prevent the upstream flow of hot combustion gases from combustor assemblies 206 into secondary manifold 222. Alternatively, the residual fuel between isolation valves 215 and secondary staging valve 242 may be vented to the atmosphere in the case of fuel gas, or drained from secondary manifold 222 in the case of liquid fuel. Upon a return to the first mode of operation, vent 228 may be activated to discharge the remaining fuel from secondary manifold 222. Accordingly, because fuel delivery system 200 either: stores dormant fuel between staging valve 242 and isolation valve 215; pressurizes the cavity between staging valve 242 and isolation valve 215; or vents residual fuel remaining in secondary manifold 222 through vent 228 to the atmosphere, gas turbine engine 100 does not require a purge system to remove residual fuel from secondary manifold 222 when secondary fuel circuit 204 is non-operational.

Figure 3:
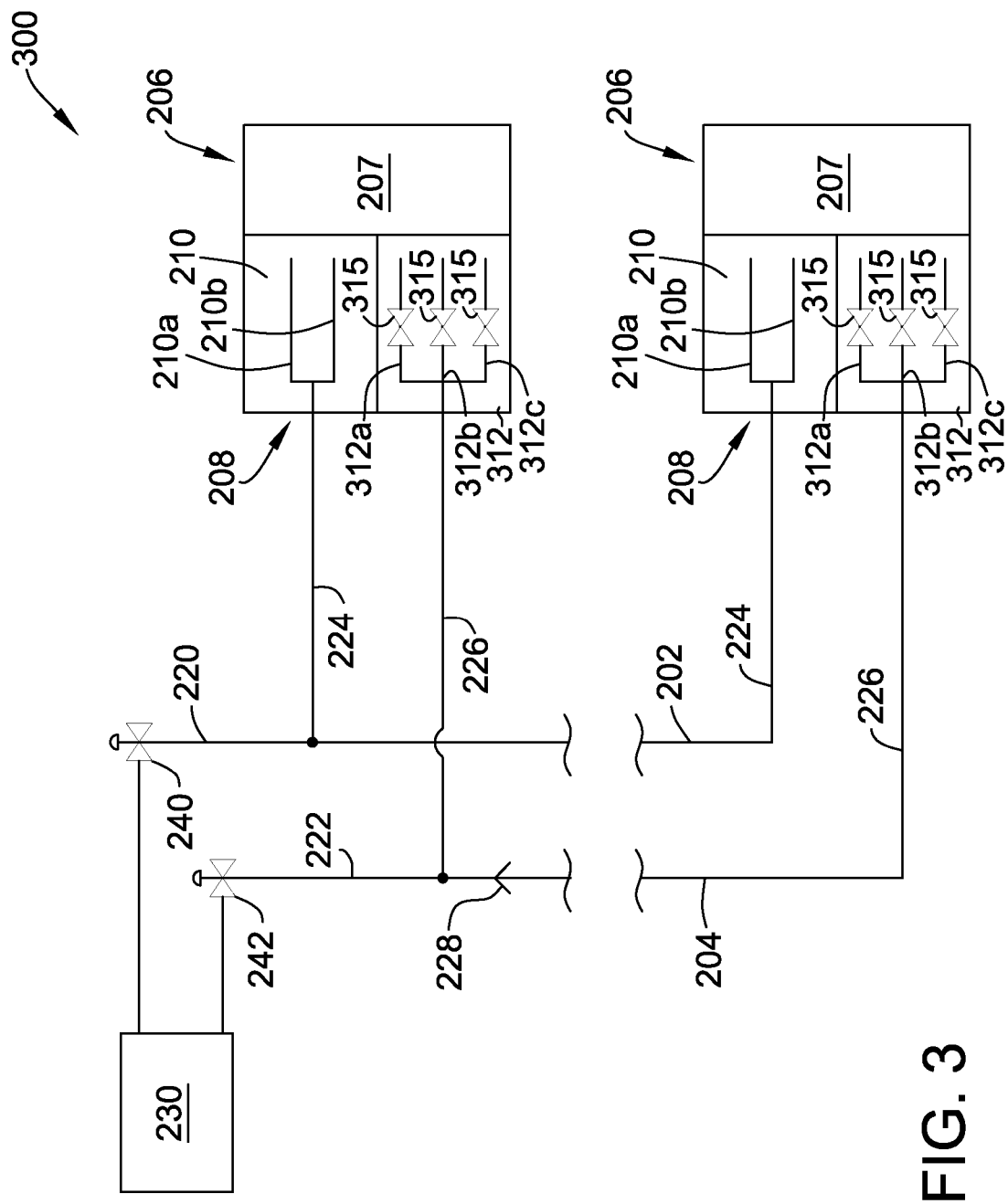
FIG. 3 is a simplified block diagram of an alternative fuel delivery system that may be utilized with the gas turbine engine shown in FIG. 1.

FIG. 3 is a simplified block diagram of an alternative fuel delivery system 300 that may be utilized with the gas turbine engine 100 shown in FIG. 1. Fuel delivery system 300 is substantially similar to fuel delivery system 200 (shown in FIG. 2) in operation and composition, with the exception that fuel delivery system 300 includes an isolation valve 315 coupled to at least one of nozzles 312a, 312b, and/or 312b within secondary fuel nozzle assemblies 312 rather than isolation valves 215 coupled to secondary fuel line 226 adjacent to secondary fuel nozzle assemblies 212 and combustor assemblies 206. As such, components shown in FIG. 3 that are also shown in FIG. 2 are labeled with the same reference numbers used in FIG. 2.

Isolation valves 315 of fuel delivery system 300 cause isolation of combustor assemblies 206 from secondary fuel circuit 204 to occur at the individual nozzle level within secondary nozzles assemblies 312 such that any combustion gases traveling upstream from combustion chamber 207 are blocked by isolation valves 315 and are prevented from escaping combustor assembly 206. In the exemplary embodiment of fuel delivery system 300, isolation valves 315 are passively controlled check valves operated by a biasing mechanism (not shown) within isolation valve 315. Because isolation valves 315 are coupled to each of secondary fuel nozzles 312a, 312b, and/or 312c, isolation valves 315 facilitate preventing combustion gases from traveling upstream into secondary fuel lines 226 or secondary manifold 222 from combustor assembly 206.

The fuel delivery system described herein includes parallel fuel circuits that enable continuous fuel flow to each combustor assembly via a primary fuel circuit, while using isolation valves to prevent the mixture of combustion gas and fuel in a secondary idle fuel circuit during a first mode of operation. Furthermore, the exemplary fuel system transitions at least one secondary idle fuel circuit to enable continuous fuel flow to each combustor assembly via both the primary fuel circuit and a secondary fuel circuit during a second mode of operation.

Described herein is an exemplary fuel delivery system that uses isolation valves to prevent the back flow of hot combustion gases into an idle fuel circuit. In known gas turbine engines including multiple fuel circuits, an idle circuit either requires purging by compressed air or an inert gas to remove fuel from the idle circuit, or fuel may be simply left in the idle circuit. Purging requires a complex and expensive piping and valve system and may also require the use of heat exchangers to cool the purge air. However if fuel is left in the idle circuit, then there is a risk of hot air or combustion gases mixing with the fuel to combust within the idle circuit. The exemplary fuel delivery system is configured to prevent the mixture of fuel and hot air or combustion gases using isolation valves such that purging an idle fuel circuit with air is not required.

In one embodiment, the isolation valves are coupled within the idle fuel circuit proximate to each combustor assembly. Alternatively, the isolation valves may be coupled to at least one of the idle fuel nozzles that comprise the idle fuel nozzle assembly such that the isolation valves are integral with the combustor assemblies. In operation, the exemplary fuel system uses the isolation valves to either: store dormant fuel between a staging valve and the isolation valves; pressurize the empty cavity of the idle fuel circuit between the staging valve and isolation valves; or vent residual fuel remaining in the idle fuel circuit through a vent to the atmosphere. Accordingly, a gas turbine engine operating as such with isolation valves does not require a purge system to remove residual fuel from an idle fuel circuit, and is therefore simpler and more cost efficient than known purging systems.

Exemplary embodiments of methods and systems for operating gas turbine engines are described above in detail. The fuel delivery systems having multiple fuel circuits and methods for operating such systems are not limited to the specific embodiments described herein, but rather, components of systems and/or steps of the methods may be utilized independently and separately from other components and/or steps described herein. For example, the methods may also be used in combination with other fuel delivery systems having multiple fuel circuits and methods, and are not limited to practice with only the fuel delivery systems and methods as described herein. Rather, the exemplary embodiment can be implemented and utilized in connection with many other fuel delivery applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel delivery system for a gas turbine engine including a plurality of combustor assemblies, said fuel delivery system comprising:
    a primary fuel circuit configured to continuously supply fuel to each of the plurality of combustor assemblies during a first mode of operation and a second mode of of operation; and
    at least one secondary fuel circuit configured to supply fuel to each of the plurality of combustor assemblies during the second mode of operation, said secondary fuel circuit comprising a secondary manifold and a plurality of isolation valves, each of said plurality of isolation valves coupled in flow communication with said secondary manifold and one of the plurality of combustor assemblies, wherein during the first mode of operation, said secondary manifold is isolated from said primary fuel circuit and said plurality of isolation valves prevent fluid flow upstream into said secondary manifold.

2. The fuel delivery system in accordance with claim 1, wherein at least one of said plurality of isolation valves is optionally a passively controlled check valve or an actively controlled actuated valve, wherein a controller is configured to control said actuated valve.

3. The fuel delivery system in accordance with claim 1, wherein each of said plurality of isolation valves is optionally coupled to said secondary fuel circuit upstream and proximate to each of said plurality of combustor assemblies or each of said plurality of isolation valves is integral to each of said plurality of combustor assemblies such that each of said plurality of isolation valves is coupled to at least one secondary fuel nozzle within each of said plurality of combustor assemblies.

4. The fuel delivery system in accordance with claim 1, wherein said primary fuel circuit further comprises a primary manifold coupled to a primary staging valve, and said secondary manifold is coupled to a secondary staging valve.

5. The fuel delivery system in accordance with claim 4, wherein said secondary staging valve is configured to selectively open during said first mode of operation to enable fuel to flow into said secondary manifold, and wherein each of said plurality of isolation valves is configured to selectively close to prevent the flow of fuel from said secondary manifold to said plurality of combustor assemblies during said first mode of operation.

6. The fuel delivery system in accordance with claim 4, wherein said secondary staging valve configured to selectively open during said second mode of operation to enable fuel to flow to said secondary manifold, and wherein each of said plurality of isolation valves is configured to selectively open to enable fuel to flow to each of said plurality of combustor assemblies through said secondary fuel circuit during said second mode of operation.

7. The fuel delivery system in accordance with claim 4, wherein said secondary staging valve is configured to selectively close to prevent the flow of fuel to said secondary manifold during a transition from said second mode of operation to said first mode of operation, and wherein each of said plurality of isolation valves is configured to selectively close to prevent the flow of hot air or combustion products from said plurality of combustor assemblies to said secondary manifold.

8. The fuel delivery system in accordance with claim 7, wherein said secondary manifold is pressurized between said secondary staging valve and each of said plurality of isolation valves to a higher pressure than the operating pressure of the plurality of combustor assemblies to facilitate preventing upstream fluid flow into said secondary manifold.

9. A method for controlling fuel flow in a gas turbine engine including a plurality of combustor assemblies, each of the combustor assemblies including at least one fuel circuit, wherein a fuel delivery system supplies each fuel circuit with fuel, said method comprising:
    supplying fuel to each of the plurality of combustor assemblies via a primary fuel circuit during a first mode of operation; and
    supplying fuel to each of the plurality of combustor assemblies via the primary fuel circuit and at least one secondary fuel circuit during a second mode of operation, wherein each of the at least one secondary fuel circuits comprises a secondary manifold and a plurality of isolation valves coupled in flow communication with the secondary manifold and one of the plurality of combustor assemblies, wherein during the first mode of operation, the secondary manifold is isolate from said primary fuel circuit and the plurality of isolation valves are configured to facilitate prevention of fluid flow upstream into the secondary manifold.

10. The method in accordance with claim 9, the fuel delivery system further including a plurality of staging valves and manifolds, said method further comprising:
    opening a primary staging valve to enable fuel to flow to the plurality of combustor assemblies through a primary manifold during the first mode of operation;
    opening a secondary staging valve to enable fuel to flow into the secondary manifold during the first mode of operation; and
    closing each of the plurality of isolation valves to prevent the flow of fuel to the plurality of combustor assemblies through the secondary manifold during the first mode of operation.

11. The method in accordance with claim 9, the fuel delivery system further including a plurality of staging valves and manifolds, said method further comprising:
    opening a primary staging valve to enable fuel to flow to the plurality of combustor assemblies through the primary manifold during the second mode of operation;

opening a secondary staging valve to enable fuel to flow to the secondary manifold during the second mode of operation; and opening each of the plurality of isolation valves to enable fuel to flow to the plurality of combustor assemblies through the secondary manifold during the second mode of operation.

12. The method in accordance with claim 9, the fuel delivery system further including a plurality of staging valves and manifolds, said method further comprising:

opening a primary staging valve to enable fuel to flow to the plurality of combustor assemblies through the primary manifold during a transition from the second mode of operation to the first mode of operation;

closing a secondary staging valve to prevent the flow of fuel to the secondary manifold during a transition from the second mode of operation to the first mode of operation; and closing each of the plurality of isolation valves to prevent the flow of hot combustion gases from the plurality of combustor assemblies into the secondary fuel manifold during a transition from the second mode of operation to the first mode of operation.

13. The method in accordance with claim 12 further comprising pressurizing the secondary manifold between the secondary staging valve and each of the plurality of isolation values to a higher pressure than the operating pressure of the plurality of combustor assemblies to facilitate preventing fluid flow upstream into the secondary manifold during the first mode of operation.

14. The method in accordance with claim 12 further comprising venting the secondary manifold between the secondary staging valve and each of the plurality of isolation valves to remove gases from the secondary manifold.

15. A gas turbine engine assembly comprising:

a plurality of combustor assemblies;

a primary fuel circuit configured to continuously supply fuel to each of said plurality of combustor assemblies during a first mode of operation and a second mode of operation; and at least one secondary fuel circuit configured to supply fuel to each of said plurality of combustor assemblies during said second mode of operation, said secondary fuel circuit comprising a secondary manifold and a plurality of isolation valves, each of said plurality of isolation valves coupled in flow communication with said secondary manifold and one of said plurality of combustor assemblies, wherein said plurality of isolation valves are configured to prevent fluid flow upstream into said secondary manifold.

16. The gas turbine engine assembly in accordance with claim 15, wherein at least one of said plurality of isolation valves is optionally a passively controlled check valve or an actively controlled actuated valve, wherein a controller is configured to control said actuated valve.

17. The gas turbine engine assembly in accordance with claim 15, wherein each of said plurality of isolation valves is optionally coupled to said secondary fuel circuit upstream and proximate to each of said plurality of combustor assemblies or each of said plurality of isolation valves is integral to each of said plurality of combustor assemblies such that each of said plurality of isolation valves is coupled to at least one secondary fuel nozzle within each of said plurality of combustor assemblies.

18. The gas turbine engine assembly in accordance with claim 15 further comprising a plurality of staging valves and manifolds, wherein a primary staging valve is configured to open during said first mode of operation to enable fuel to flow to each of said plurality of combustor assemblies through a primary manifold, and wherein a secondary staging valve is configured to selectively open during said first mode of operation to enable fuel to flow to said secondary manifold, and wherein each of said plurality of isolation valves is configured to close to prevent the flow of fuel from said secondary manifold to the plurality of combustor assemblies during said first mode of operation.

19. The gas turbine engine assembly in accordance with claim 15 further comprising a plurality of staging valves and manifolds, wherein a primary staging valve is configured to open during said second mode of operation to enable fuel to flow to each of said plurality of combustor assemblies through a primary manifold, and wherein a secondary staging valve is configured to open during said second mode of operation to enable fuel to flow to said secondary manifold, and wherein each of said plurality of isolation valves is configured to selectively open to enable fuel to flow to the plurality of combustor assemblies through said secondary fuel circuit during said second mode of operation.

20. The gas turbine engine assembly in accordance with claim 15 further including a plurality of staging valves and manifolds, wherein a primary staging valve is configured to remain open during a transition from said second mode of operation to said first mode of operation to enable fuel to flow to each of said plurality of combustor assemblies through a primary manifold, and wherein a secondary staging valve is configured to close to prevent the flow of fuel to said secondary manifold during a transition from said second mode of operation to said first mode of operation, and wherein each of said plurality of isolation valves is configured to selectively close to prevent the flow of hot combustion products from the plurality of combustor assemblies into said secondary manifold.

* * * * *